Fig.1.

Aug. 31, 1937.     J. J. LAZNA     2,091,783
CAR TRUCK
Filed Oct. 26, 1935     10 Sheets-Sheet 2

INVENTOR:
James J. Lazna
BY
Clarence Akers
his ATTORNEY

Fig. 5.

Aug. 31, 1937.                J. J. LAZNA                 2,091,783
                               CAR TRUCK
                         Filed Oct. 26, 1935           10 Sheets-Sheet 5

INVENTOR:
James J. Lazna
BY
Clarence D. Kerr
his ATTORNEY.

Fig. 12.

Aug. 31, 1937.  J. J. LAZNA  2,091,783
CAR TRUCK
Filed Oct. 26, 1935  10 Sheets-Sheet 8

INVENTOR:
James J. Lazna
BY
his ATTORNEY

Patented Aug. 31, 1937

2,091,783

UNITED STATES PATENT OFFICE 2,091,783

CAR TRUCK

James J. Lazna, Cleveland, Ohio, assignor to National Malleable and Steel Castings Company, Cleveland, Ohio, a corporation of Ohio Application October 26, 1935, Serial No. 46,877

31 Claims. (Cl. 105—197).

This invention relates to truck assemblies for use in railway rolling stock and is particularly directed to side frame and bolster construction by which greatly improved wearing qualities of the parts and riding qualities of the rolling stock are obtained.

One object of my invention is to provide a remounting for the ends of the bolster in their respective side frames whereby the bolster is resiliently supported in centralized relationship with each side frame and resiliently maintained in squared relationship with said side frames. The side frames of a car truck constructed in accordance with my invention are also provided with a cushioned or spring resisted tie.

A further object is the provision of snubbing or damping means to control the oscillations of the load springs and improve the riding qualities of the car supported by the truck, and also means for snubbing or damping movement of the bolster longitudinally of the side frame as sometimes occurs during sudden starting and stopping.

An important feature of my invention is the elimination of substantially all wear between the bolster and side frames due to this centralizing action.

A further feature of my invention is the protection of the load springs against being driven in the over-solid condition and thereby acquiring permanent set and distortion.

One important advantage of my improved car truck construction resides in the feature that one set of wheels may be readily removed without disassembling the whole truck. This quick wheel change feature is very helpful in making repairs.

These and other features and objects of this invention, which will become more apparent from the detailed description of several embodiments thereof, may be incorporated in trucks without materially changing bolsters and side frames now in use.

Referring more particularly to the embodiments illustrated in Figures 1-5 inclusive, numeral 10 indicates a side frame having an opening or window 11 therein to receive the end of a bolster 12. This side frame as shown comprises an upper or compression member 13, and downwardly inclined tension members 14 connected by a horizontal tension section 15. The latter is box shaped in cross-section, comprising a bottom wall 16, side walls 16', 16', integral with the respective bottom and side walls of the adjacent inclined tension members 14, 14, and also comprising an integral top flange or shelf 17. Columns 18, 18 depending from the compression member 13, define the bolster receiving window 11 in conjunction with said compression member and said shelf 17. The bottom wall 16 of said tension section 15 is provided with depressions 16", 16" in the top surface thereof to receive the sets of coil springs 19, each set preferably comprising an outer and an inner coil. These springs may be supported on suitable spring seat members 20, 20 and support spring caps 21, 21. The spring caps are adapted to support lugs 22, 22 of the bolster 12. Such lugs are preferably hollow, at least at their lower ends, so that they may receive the upper portion of the members 23, 23 seated on the spring caps 21, 21. These members have lower portions 24, 24 extending downwardly within the inner coil of the springs 19 and therefore maintain said springs in proper relationship and alignment with the bolster lugs.

Figure 1:
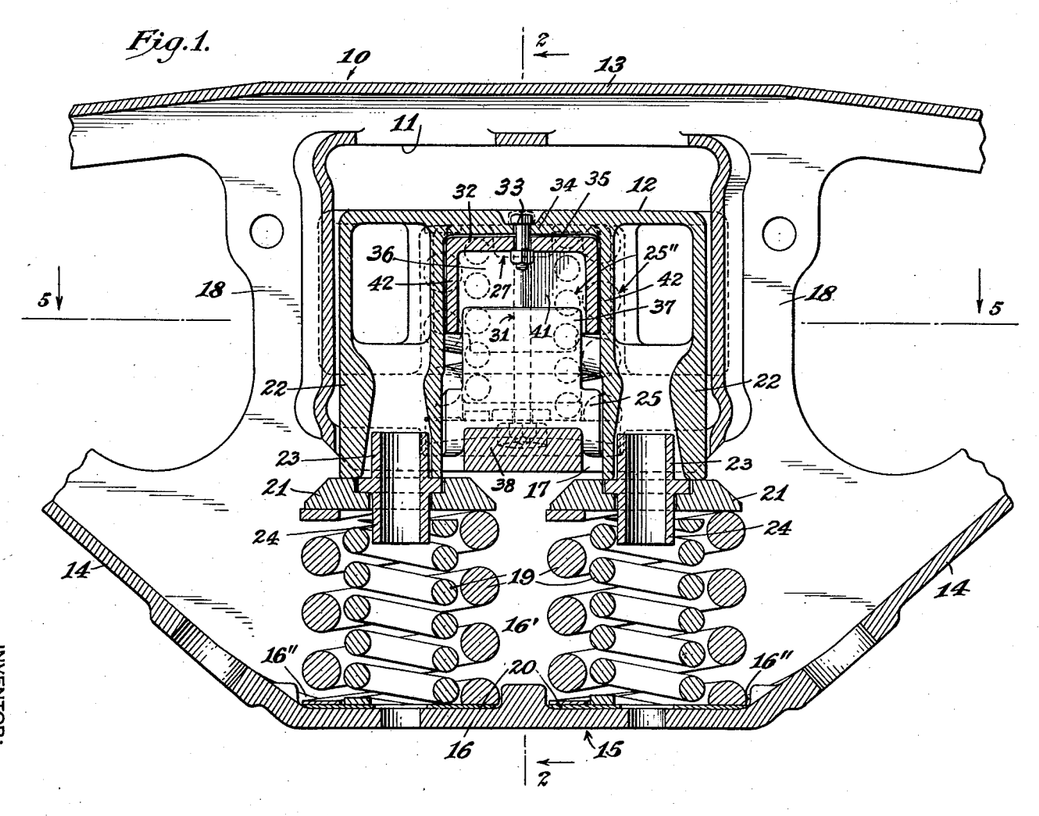
Figure 1 is a longitudinal vertical sectional view through a side frame having what is known as a shelf therein and provided with an upper and lower tier of springs, showing the bolster in assembled relationship therewith.
Figure 2:
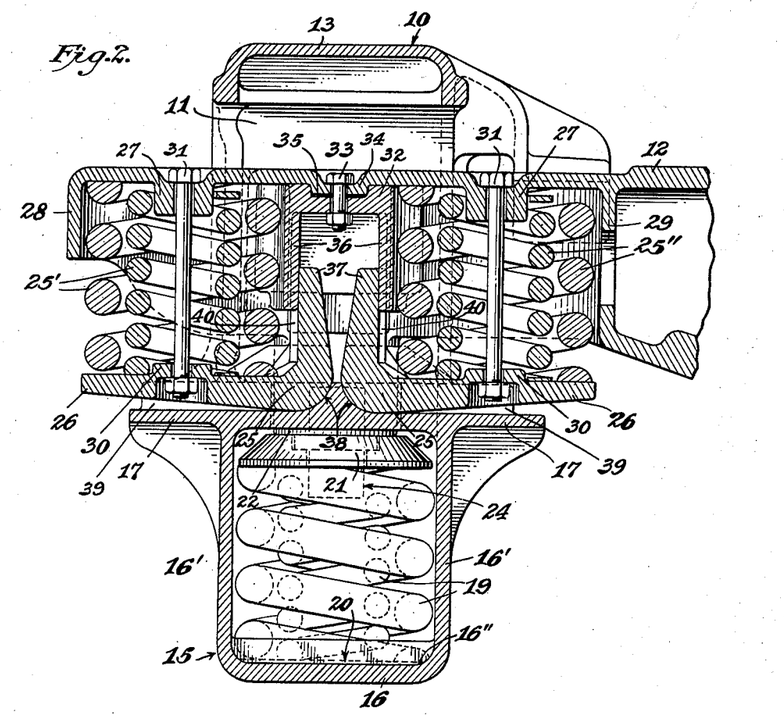
Figure 2 is a transverse section on the line 2—2 of Fig. 1.
Figure 3:
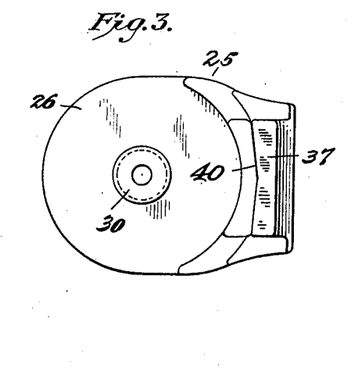
Figure 3 is a top or plan view of a rocker arm employed in this assembly.
Figure 4:
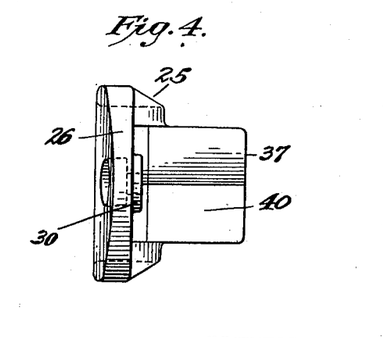
Figure 4 is a side view of the rocker arm shown in Fig. 3 as seen from the left hand side thereof.
Figure 5:
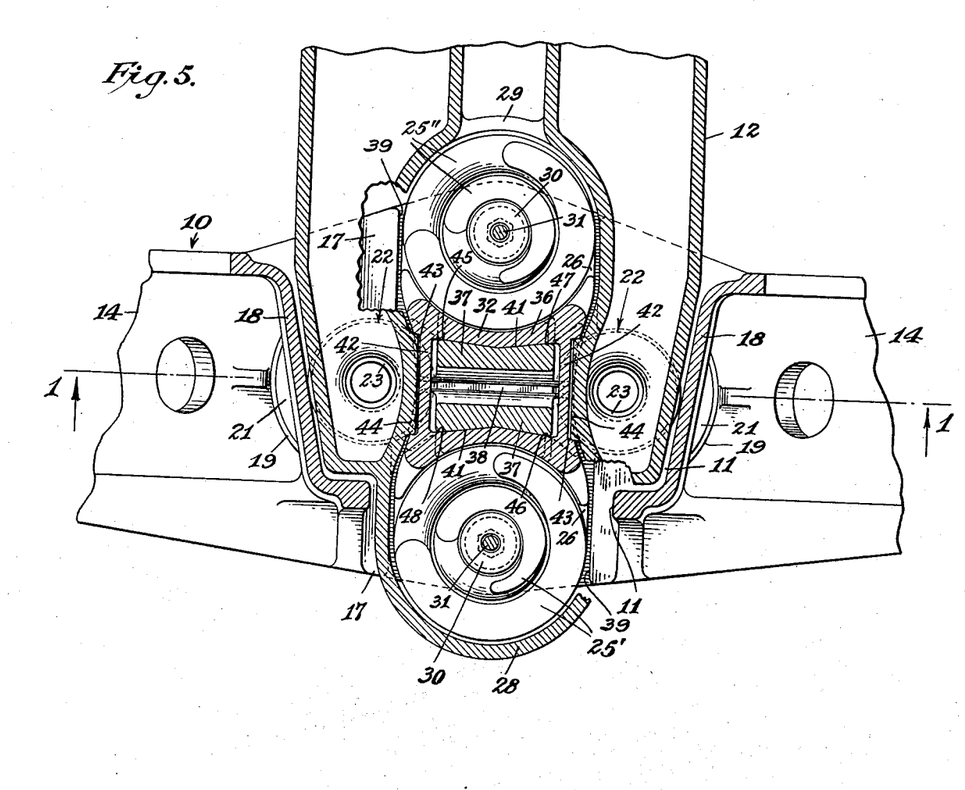
Figure 5 is a horizontal section on line 5, 5 of Fig. 1.
Figure 6:
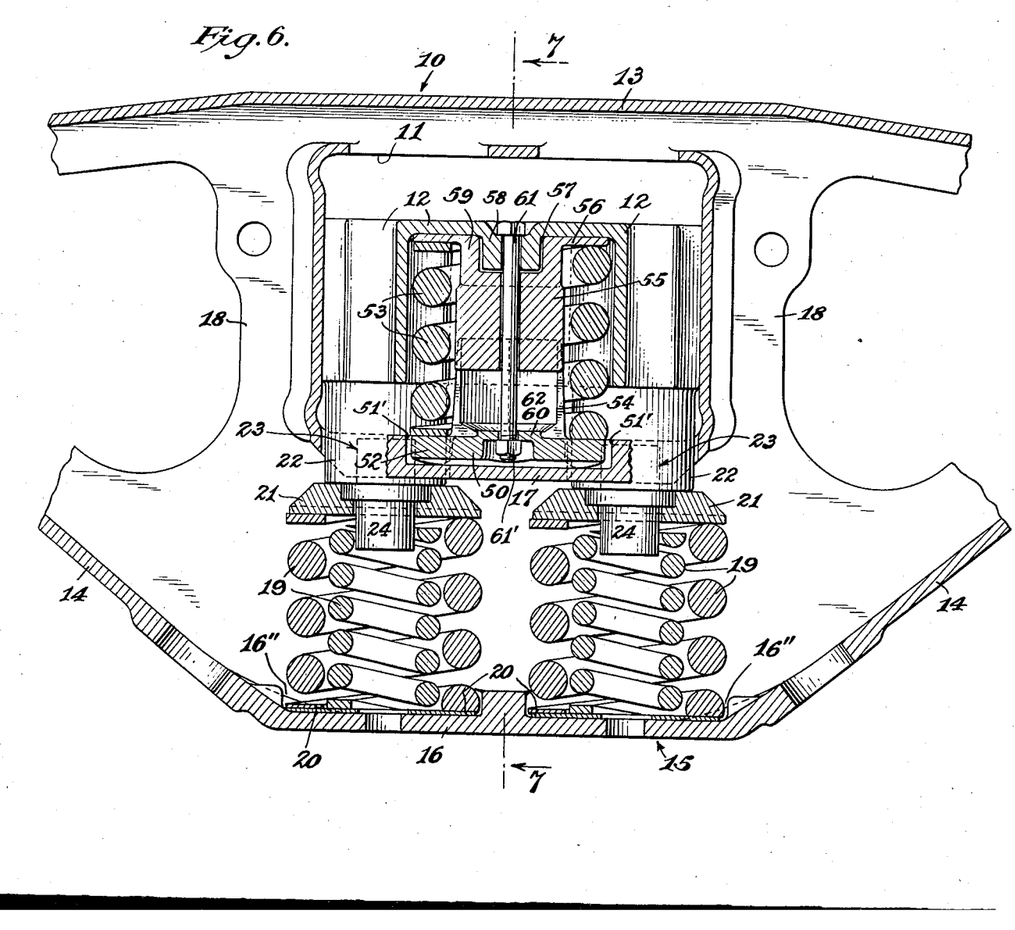
Figure 6 is a vertical sectional view similar to Fig. 1 showing a modification of the construction and assembly.
Figure 7:
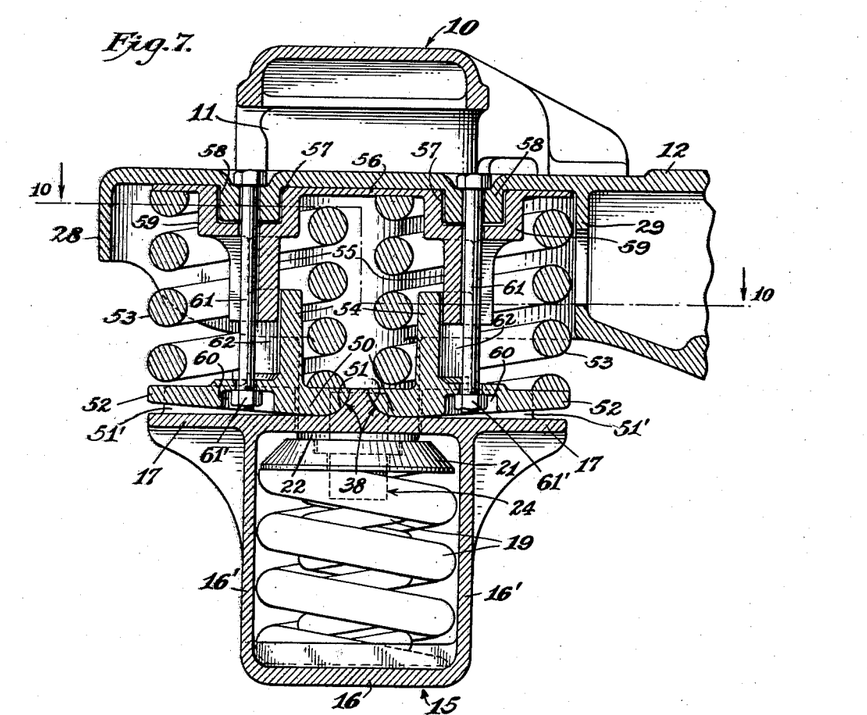
Figure 7 is a vertical section on line 7, 7 of Fig. 6.
Figure 8:
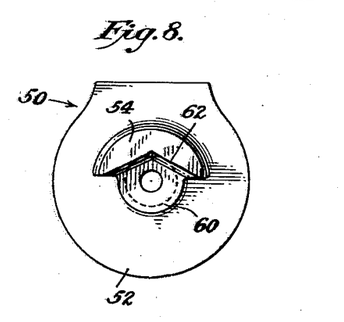
Figure 8 is a plan view of a rocker arm as employed in this modification.
Figure 9:
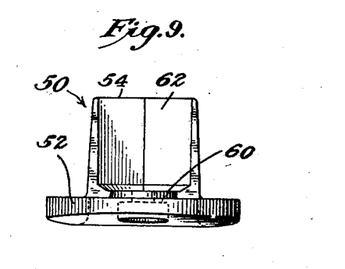
Figure 9 is a front side view of this rocker arm.
Figure 10:
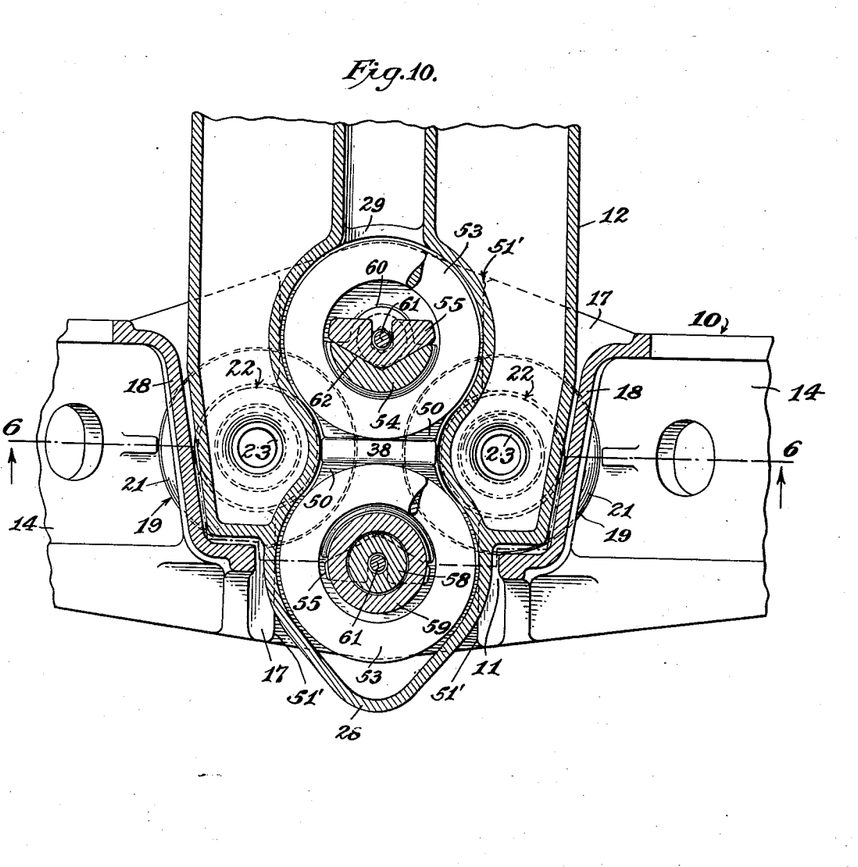
Figure 10 is a horizontal section on the offset line 10—10 of Fig. 7.
Figure 11:
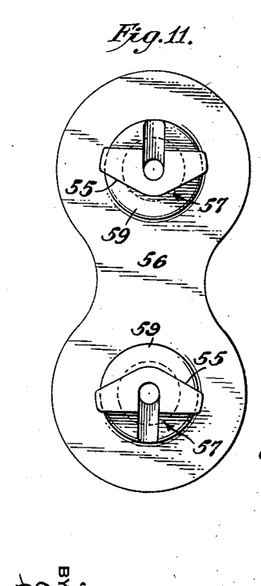
Figure 11 is a bottom plan view of a combined spring cap and friction member which may be used with the modification of my invention illustrated in Fig. 6.
Figure 12:
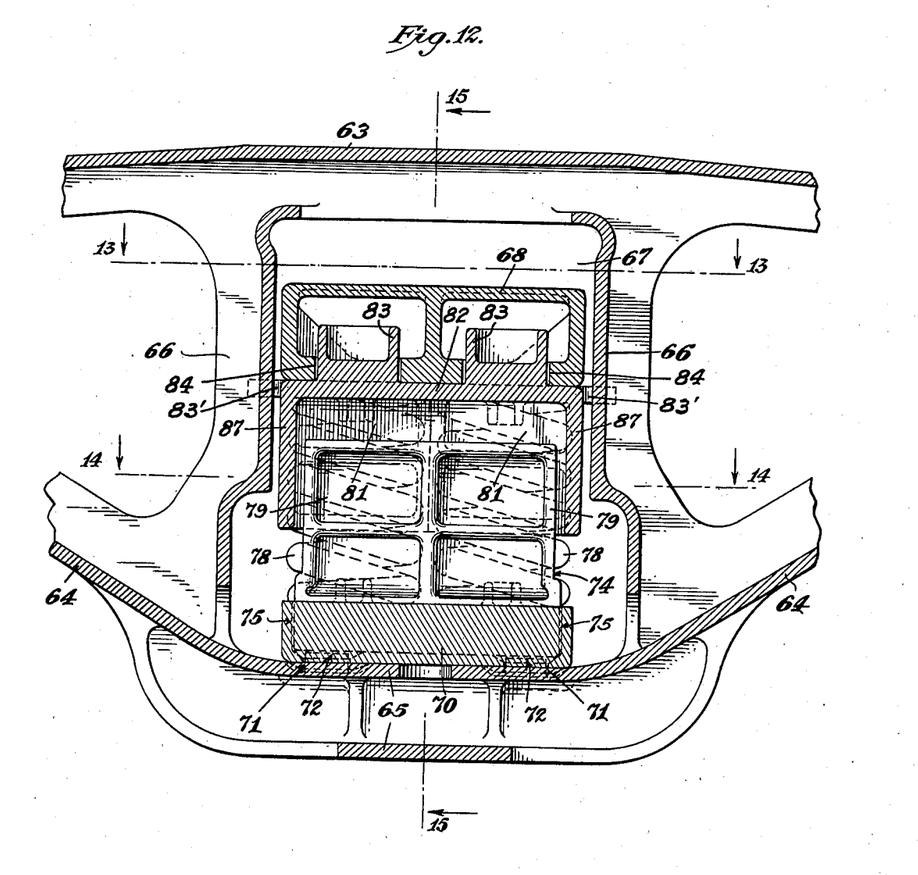
Figure 12 is a longitudinal vertical sectional view of a further modification in which a single tier of four springs is employed for each side frame.

The two sets of springs 25' and 25" of the upper tier, as may be best seen in Figure 2, are mounted some distance apart upon horizontally extending portions 26 of the rocker arms 25, which in turn are supported on the aforesaid shelf 17. The ends of the bolster are hollow or channel shaped longitudinally thereof and provided with dowels 27 and flanges 28 and 29 adapted to receive and confine the top portions of springs 25' and 25". The horizontal portions 26 of the rocker arms may also be provided with upwardly extending dowels 30 and the rocker arms 25 may be held in assembled position with the springs and bolster by means of the bolts 31. At a point centrally of the said side frame, and between the two springs of the upper tier, a friction housing 32 is connected to the bolster by means of the bolt 33. This friction housing is interlocked with said bolster by means of the downwardly extending off-set section 34 cooperating with a recess 35 in the friction member. This friction member has downwardly extending sides 36, 36 adapted to frictionally engage surfaces on the vertical arms 37 of the rocker arms 25. These rocker arms are pivotally mounted on seats 38 which are preferably formed integral with the shelf 17 of the side frame but which may be in the form of separate elements mounted on said shelf in any desirable manner. The load on the springs of the upper tier is thereby transmitted to the side frame by means of the rocker arms. With the horizontal portions 26 of said arms being pressed downwardly, the rocker arms tend to rotate, the vertical arms 37 tending to move away from each other. This brings and holds the friction surfaces on these arms, in contact with friction surfaces 36, 36 on the friction member encasing said vertical arms. The load on the upper springs is thereby transmitted to the side frame at the curved rocker arm seats along lines adjacent to the vertical longitudinal center line of the side frame. More specifically, the downward vertical force applied to the horizontal arms through the springs thereon and the horizontal reaction of the friction housing against the vertical arm produce a resultant force extending downwardly and inwardly through the corresponding seat of the rocker, with consequent transmission of the load to said seat adjacent the longitudinal center line of the side frame and constant maintaining of the rockers against their respective seats. Abutments 39, formed by recessing the shelf 17, serve to confine the rockers and prevent any substantial movement thereof longitudinally of the side frame. The friction surfaces 40 of the arms 37 are preferably formed with converging plane surfaces having a horizontal cross section resembling a flattened V. These surfaces are adapted to frictionally bear on the surfaces 41 of the friction member which are shaped to cooperate therewith. It is also desirable to have as large an area of frictional contact as possible within the limited space available. The friction member is provided with end walls 42 which have grooves 43 on their outer surface to receive projections 44 on the inner side walls of the bolster. While the friction member 32 might be cast integrally with the bolster, I prefer to form it as a separate element and then to connect it rigidly to the bolster as illustrated. It is preferable to manufacture this element separately to obtain high wear resistance since it may be desirable to employ a special composition or heat treatment therefor. By making these elements separately, maintenance and replacement costs may also be very effectively reduced.

In the assembly which I have just described, the bolster is resiliently prevented from lateral movement with respect to the side frame by reason of the fact that as such movement takes place one or the other of the springs 25' or 25" will be compressed, thus tending to force the bolster back to its original position. The bolster is also resiliently held from moving longitudinally with respect to said side frame since by the above-described angular construction of the friction surfaces of the rocker arms and the friction member, the vertical arms of the rockers would be pressed in toward each other. Both springs 25' and 25" would thereby be compressed, again tending to force the bolster back to its original position. It is always preferable, of course, in car truck assemblies to maintain the bolster and side frames in squared relationship with respect to each other. A spring plank is ordinarily provided for this purpose having openings to receive dowels on the side frame; which openings in service become rapidly worn thus ceasing to perform their desired function after a time. When the bolster is angled out of square with a side frame in my improved construction the vertical arms of the rockers contact with the inner surfaces of the friction member at diametrically opposite corners thus producing a couple by reason of the added compression of the springs which tends to bring the bolster back into squared relationship. For example, if the bolster of Fig. 5 should be turned clockwise with respect to the side frames, the rocker arms would be separated from the friction surfaces of the friction member at the corners 45 and 46, contacting said friction surfaces only at the corners 47 and 48. The force exerted by the rocker arms at these corners would therefore tend to twist the bolster back into squared relationship with the side frame.

In constructing a side frame and assembly of the type just described, the vertical arms 37 and/or the depending portions 36 of the friction member may be made long enough to prevent the springs 25', 25" from being driven solid. For example, if the springs 25', 25", as shown in Figure 2, may be compressed 2 inches before becoming solid the amount of clearance between the vertical arms 37 and the top of the friction member 32 may be made $1\frac{15}{16}$ inches. Thus, if due to track conditions, or for other reasons, the springs of a car embodying this construction should oscillate so as to be driven solid, any over-solid blows would be transmitted from the bolster directly to the vertical arms 37 of the rockers, rather than by way of springs 25', 25", thereby protecting said springs.

By the use of a rocker type truck as described, snubbing and damping of the coil springs is provided, eliminating the danger of spring breakage, damage to the lading, and derailment. With the bolster resiliently supported, resiliently squared, and resiliently centralized with respect to the side frame, the side frames are tied together primarily by this resilient means and only secondarily by the bolster lugs. This tends to eliminate all wear between the bolster or its lugs and the side frames with attendant increase in the life of the truck. Such improvements are obtained moreover without sacrificing any of the advantages such as ease of assembly and disassembly, flexibility, strength, and the like, of the construction of this type already in use. The parts which take all the wear are relatively small and simple and may readily be made of special wear resistant metal which may be replaced much more cheaply than a whole side frame or bolster.

A modification of my invention employing similarly a side frame of the shelf type with an upper and lower tier of load springs is illustrated in Figures 6–11 and comprises a side frame 10 having a window 11 with a bolster 12 mounted therein, as already described. The lower tier of springs and the parts associated therewith are also similar. The springs of the upper tier, however, are relatively close together in conformance with the usual practice in trucks of this type. In this embodiment the shelf 17 has integrally formed rocker arm seats 38 similar to those described in connection with Figure 1 on which the curved portions 51 of rockers 50 are mounted. Upwardly extending abutments 51' are provided on the rocker seat to prevent movement of the rockers longitudinally of the side frame in the same manner effected by the abutments 39 in the previously described embodiment. The horizontally extending arms 52 of these rockers 50 are adapted to carry relatively heavy coil springs 53.

This modification differs from the embodiment previously described in that the inner coil springs are eliminated and vertical arms 54 of the rockers 50 extend upwardly within the coils of the springs 53. These vertical arms are adapted to engage downwardly projecting friction surfaces 55 of the combination spring cap and friction member 56. This member 56 is provided with recesses 57 which snugly receive the dowels 58 on the under side of the top of the bolster. The recesses 57 are formed in the depending portions or dowels 59 of the member 56, which dowels, together with the friction surfaces 55, extend downwardly inside the springs 53. The horizontal portion of the rocker arms 50 may be recessed as at 60, and the bolster, spring cap and friction member 56, springs 53 and rocker arms 50 may be all held in assembled relationship by means of the bolts 61, the nuts 61' being received in the recess 60. It is to be noted that the friction surfaces 62 of the rocker arms 50 are converging and of V shaped cross section similar to the friction surfaces of the rocker arms 25 in the construction of Figure 1. The friction surfaces 55 of the member 56 are shaped to cooperate therewith, thus producing an assembly which will resiliently oppose movement of the bolster longitudinally with respect to the side frame, and will also resiliently accomplish squaring and centralizing of the bolster with respect to the side frame, in the manner already described. This assembly also provides softer riding qualities by reason of the elimination of the inner coil springs in the upper tier.

A further modification of the invention is illustrated in Figures 12–21. This embodiment is associated with side frames which provide for a single tier of four springs. A side frame of this type comprises compression member 63, tension members 64 and a horizontal section 65, along with columns 66 defining a window 67 adapted to receive a bolster 68. This side frame may be of standard construction and the bolster may also be of standard construction, or have its end portions slightly reduced in thickness. Where both bolster and side frame are of standard size and dimensions, it is necessary to employ a shorter spring than usual, but in my preferred embodiment illustrated, the end portion of the bolster is of less depth than usual, enabling the use of normal size springs of full capacity. The base or horizontal section 65 of the side frame may support on the top surface thereof a rocker arm seat member 70. This rocker arm seat is preferably provided with openings 71 adapted to register with dowels 72 on the side frame to retain the seat in position, and also with centrally disposed curved portions 73 adapted to receive the correspondingly curved portions of the rocker arms 74.

Seat 70 is also provided with upwardly extending sides or flanges 75 to confine the movement of the rocker arms therein longitudinally of the side frame. Rocker arms 74 are preferably formed with horizontal portions 76, providing seats for the springs 78 and having dowels 77 adapted to position said springs. Vertically extending arms 79 of the rocker arms have inner surfaces 80 frictionally engaging cooperating surfaces 81 of the spring cap and friction member 82. This spring cap and friction member is held in fixed relation to the bolster by upwardly extending dowels or trunnions 83 on the top surface thereof which extend up into the recesses 84 formed in the ends of said bolster. Lugs 83' may be provided to prevent excess transverse movement of said member with respect to the side frame. Lateral extensions 85 of this combined member have downwardly extending dowels 86 and provide top spring seats or caps for the springs 78. Thus, the weight of the bolster and the load which it carries hold the various parts in assembled relationship. The spring cap and friction member is also provided with downwardly extending flanges 87 substantially in the same plane as the sides of the bolster which serve to confine the rocker arms 74, and also to provide surfaces in addition to the side walls of the bolster for limiting movement of the bolster longitudinally of the side frame. A slight amount of such longitudinal movement, however, is desirable to provide the truck assembly with the requisite flexibility. In addition to the clearance between the outer surfaces of walls 87 and the side frame columns, clearance is also present between the inner surfaces of said walls and the vertical arms 79 of the rockers 74. Rocker arms 74 are provided with converging V-shaped friction surfaces 80 cooperating with similarly shaped friction surfaces 81 on the spring cap and friction member. It will therefore be apparent that as the bolster moves longitudinally with respect to the side frame within the limits set by the flanges 87, the friction surfaces 81 produce a camming action on the friction surfaces 80 of the rocker arms tending to pinch the vertical arms of said rockers together. This compresses the load springs which then tend to restore the previous balanced condition.

By the use of an assembly such as described the bolster may be centralized and squared in a manner corresponding to that already described with respect to the other embodiments.

Figure 15:
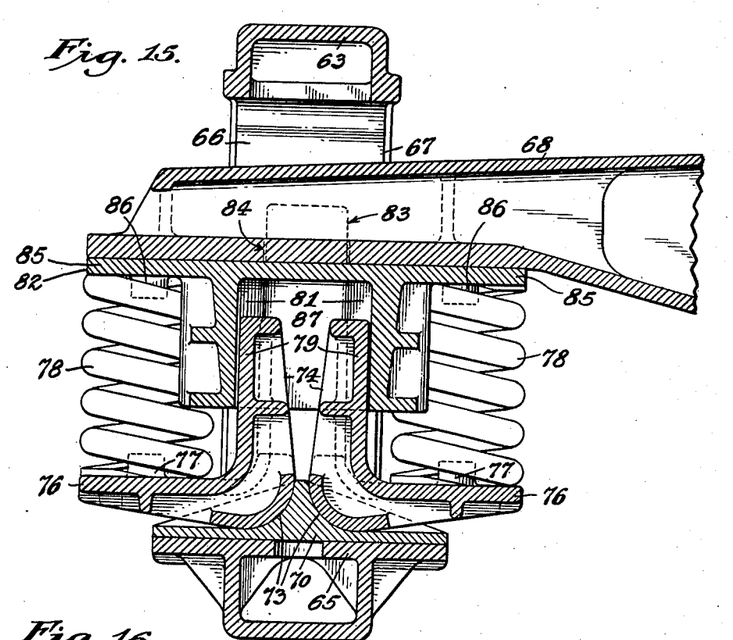
Figure 15 is a transverse vertical section on the line 15, 15 of Fig. 13.
Figure 16:
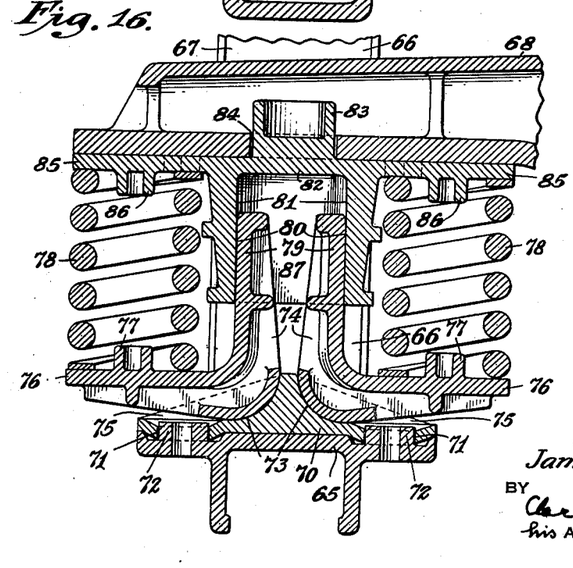
Figure 16 is a similar view on the line 16, 16 of Fig. 13.
Figure 17:
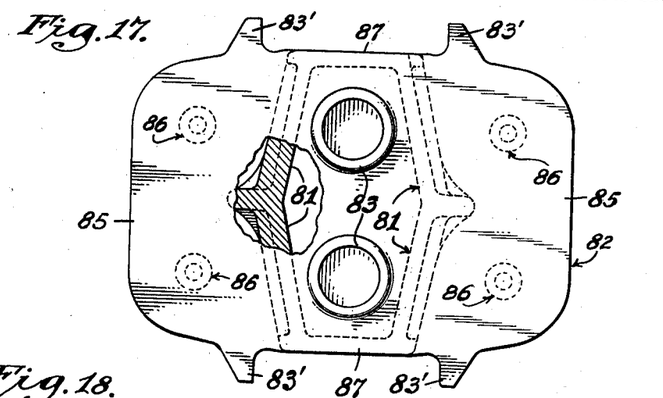
Figure 17 is a detailed plan view partly in section of the combined spring cap and friction housing employed in this further modification.
Figure 18:
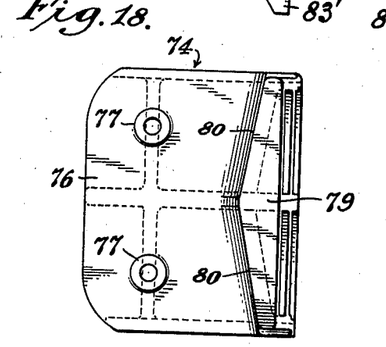
Figure 18 is a plan view of a rocker arm employed in this assembly.
Figure 19:
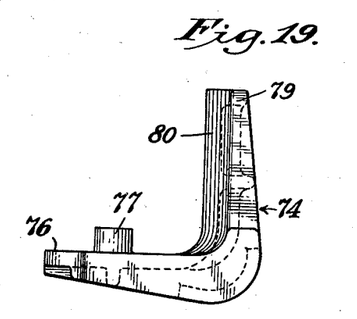
Figure 19 is a side view of the same rocker arm.
Figure 20:
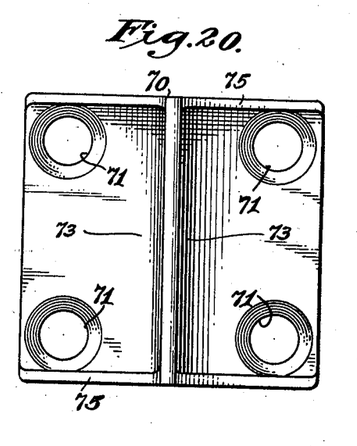
Figure 20 is a plan view of a rocker arm seat member.
Figure 21:
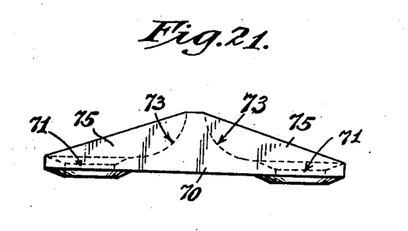
Figure 21 is a side elevation of this seat member.

Referring more particularly to Figures 15 and 16, it will be noted that if the bolster 12 is moved to the left with respect to the side frame that both coil springs on the right will be compressed. This amount of compression will be substantially proportional to the amount of lateral movement. Thus, it will be seen that when the above condition exists a force will be set up tending to restore the bolster to its central position laterally of the side frame. This force will increase with increased loads on the bolster springs and with increased lateral movement.

Figure 13:
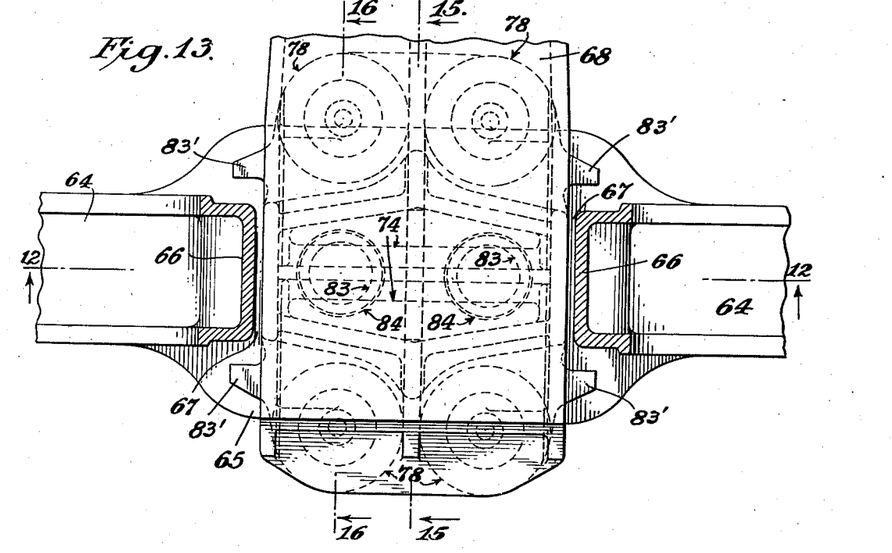
Figure 13 is a horizontal plan view partly in section on the line 13, 13 of Fig. 12.
Figure 14:
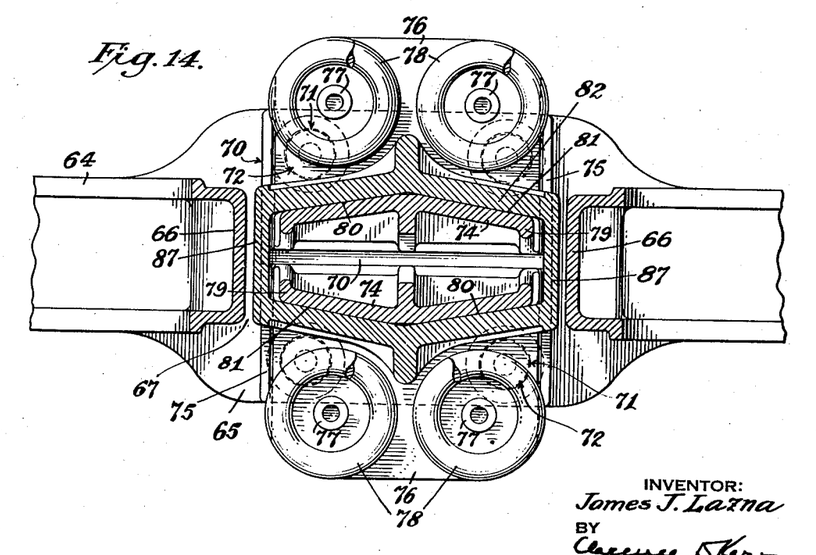
Figure 14 is a horizontal section on line 14, 14 of Figure 12.

Referring more particularly to Figures 13 and 14 it will be noted that a similar situation will exist if the bolster is moved to the left or to the right with respect to the side frame. As this happens the vertical arms 79 of the rocker arms will be pinched toward each other by reason of the shape of the cooperating friction surfaces as described above. This will, in turn, produce a compression of all four springs, proportional to the amount of longitudinal movement. Thus a similar force will be set up tending to restore the bolster to a central position. This restoring force is likewise proportional to the load on the bolster springs. If the bolster should be moved in a direction at an angle to the side frame, components of these two centralizing forces will be brought into play tending to move the bolster back along the shortest line to its central position.

When the bolster is moved longitudinally with respect to the side frame, the friction surfaces will tend to frictionally resist the movement of the bolster without, of course, materially affecting the return of the bolster to its normal position. This frictional action acts only to cushion or dampen sudden movement of the bolster with respect to the side frame and, of course, does not aid in restoring the bolster to its normal position.

A self-squaring support for the bolster is provided by this construction tending to produce a couple to automatically square the bolster with respect to the side frame in a manner such as already described with respect to the first two embodiments of my invention.

The friction surfaces here also act as snubbers for the coil springs, cushioning shocks and damping oscillations thereof. Wear is practically eliminated between bolster and side frames and the upwardly extending arms 79 may be made of correct height with respect to the height of the springs 78 to relieve said springs from harsh treatment due to over-solid blows. In this modification, the friction surfaces may extend substantially the width of the bolster, thus providing a maximum area of friction surface and reducing the rate of wear thereof.

By reason of the resilient support of the bolster ends in the side frame, the truck, or one side thereof, may be quickly and easily disassembled to provide for changing wheels and the like because the bolster ends do not have to be provided with the usual lugs limiting movement of the bolster transversely of the side frame. If it should be desired to change a wheel in a truck in this construction the bolster may be jacked up or raised so that the bottom portion thereof clears the dowels 83. The journal bearings and wedges may then be removed along with the truck brake hanger pins, after which the two side frames may be spread apart at one end and the wheels rolled out, all of the other parts remaining in assembled position until the new wheels are ready for re-assembling.

In the use of a car truck of this type having lugs on the bolster it has formerly been necessary to raise the bolster, remove the springs and finally lower the bolster until the lugs register with the enlarged lower portion of the window in the side frame. The advantages in disassembling due to my improved centralizing resilient mounting are apparent.

The car trucks illustrated in Figures 1–11 may also be easily and quickly disassembled to provide for changing wheels. In these embodiments the bolster only need be raised sufficiently for the lugs thereof to clear the shelf 17 and to lift the rockers 25 or 50 above their respective rocker seats, after which the side frames may be spread apart and the wheels rolled out as described above.

I have provided by this invention a cushioned or resilient tying means for the side frames, the tying force acting on the frames in the same plane as it would if a spring plank were used. If it should be desired, for any reason, such a spring plank could, of course, be employed. My truck assembly is considerably more flexible than any assembly possible wherein a spring plank is relied upon as the prime means for tying the side frames together. With my invention, moreover, the bolsters are not limited in width and depth and the strength thereof may therefore be materially increased.

While only three modifications of my invention have been particularly described, it is to be understood that the use of rocker arms and friction surfaces as provided in my novel construction might be applied to various other types of bolster and side frame constructions, by following the principles of this invention.

Matter described in this application but not claimed herein is claimed in the co-pending application of Roy C. Hobson, Serial Number 716,948.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck assembly, a bolster, side frames associated with said bolster at the ends thereof, and means including vertically disposed springs and rocker arms actuated by said springs and cooperating with said bolster to resist movement of said bolster transversely of said side frames.

2. In a car truck assembly, a bolster, side frames associated with said bolster at the ends thereof, said side frames each having a spring supporting portion, springs supporting said bolster on said portions, and rocker arms between said springs and said portions actuated by said bolster to compress at least one of said springs when said bolster is moved transversely of said side frames.

3. In a car truck assembly, a bolster, side frames associated with said bolster at the ends thereof, means including rocker arms and vertically disposed springs resiliently supporting said bolster on said side frames, said rocker arms cooperating with the bolster, the side frames and the springs to resist movement of said bolster longitudinally and transversely of said side frames by compression of at least one of said springs.

4. In a car truck assembly, a bolster, side frames associated with said bolster at the ends thereof, and means including rocker arms and vertically disposed springs supporting said bolster on said side frames, said rocker arms cooperating with the bolster to frictionally resist movement of said bolster longitudinally of said side frames.

5. In a car truck assembly, a bolster, side frames associated with said bolster at the ends thereof, means resiliently supporting said bolster on said side frames, and rocker arms actuated by said resilient means and cooperating with the bolster to resist movement of said bolster transversely to said side frames by a force proportional to the load on said supporting means.

6. In a car truck assembly, a bolster, side frames associated with said bolster at the ends thereof, springs supporting said bolster, and means supporting said springs and bolster on said side frames and cooperating with said bolster to frictionally resist movement of said bolster longitudinally of said side frames by a force proportional to the load on said springs.

7. In a car truck assembly, a bolster, side frames associated with said bolster at the ends thereof, coil springs supporting said bolster in said side frames, and rocker arms cooperating with said springs and bolster and reacting with said side frames to restore said bolster to a central position after movement thereof laterally of said side frames by a force proportional to the load on said springs and the extent of said lateral movement.

8. In a car truck assembly, a bolster, side frames associated with said bolster at the ends thereof, vertically disposed springs supporting said bolster in said side frames, and means cooperating with the bolster, the side frames and the springs to restore said bolster to a central position after movement thereof in any direction with respect to said side frames by a force proportional to the load on said springs and the extent of such movement.

9. In a car truck assembly, a bolster, side frames associated with said bolster at the ends thereof, springs supporting said bolster in said side frames, and means cooperating with said springs and including rocker arms fulcrumed on an axis disposed longitudinally with respect to said side frames, to cooperate with and maintain said bolster in squared relationship to said side frames.

10. In a car truck assembly, a bolster, side frames associated with said bolster at the ends thereof, springs supporting said bolster in said side frames, and means cooperating with said springs and including rocker arms fulcrumed on an axis disposed longitudinally with respect to said side frames, to maintain said bolster in squared relationship to said side frames by a force proportional to the load on said springs, said force being applied to the bolster in the form of a couple.

11. In a car truck assembly, a bolster, side frames associated with said bolster at the ends thereof, springs supporting said bolster in said side frames, and means including rocker arms fulcrumed between their ends on an axis disposed longitudinally with respect to said side frames and cooperating with the bolster to dampen oscillations of said springs, each of said rocker arms constituting the entire support for at least one of said springs.

12. In a car truck assembly, a bolster, side frames having spring plank seating-portions therein, springs supporting said bolster in said side frames, and means associated with said portions to enable said springs to cushionly resist lateral movement of one side frame with respect to the other and to resiliently tie said side frames together in substantially the plane of the spring plank seating portion.

13. In a car truck assembly, a bolster, side frames having spring plank seating-portions therein, springs supporting said bolster in said side frames, and means associated with said portions to enable said springs to cushionly resist movement of one side frame with respect to the other, said means being constructed and arranged to resiliently tie said side frames together in substantially the plane of the spring plank seating portion by forces proportional to the load on said spring and the degree of movement of said side frames.

14. A car truck comprising a bolster, a side frame associated with one end of said bolster, rocker arms pivotally supported on said side frame, springs mounted on substantially horizontal portions of said rocker arms, serving to support the end portion of said bolster, and downwardly extending friction surfaces interlocked with said bolster and engaging upwardly extending portions of said rocker arms having friction surfaces thereon, said upwardly extending portions being of just sufficient height to support the weight of said bolster when said springs are compressed to a substantially solid condition.

15. A car truck comprising a bolster, a side frame associated with one end of said bolster, rocker arms pivotally supported on said side frame, springs mounted on substantially horizontal portions of said rocker arms, serving to support the end portion of said bolster, and downwardly extending friction surfaces integral with said bolster and engaging upwardly extending portions of said rocker arms having friction surfaces thereon.

16. A car truck comprising a bolster, a side frame associated with one end thereof, a member on said side frame having curved seat portions, rocker arms pivotally supported on said seat portions, springs for supporting the bolster, each of said rocker arms having a horizontal portion forming the entire support for at least one of said springs, and downwardly extending friction surfaces connected to said bolster and engaging upwardly extending portions of said rocker arms having friction surfaces thereon.

17. A car truck comprising a bolster, a side frame associated with one end of said bolster, rocker arms pivotally supported on said side frame, springs mounted on substantially horizontal portions of said rocker arms, serving to support the end portion of said bolster, and downwardly extending friction surfaces interlocked with said bolster and engaging upwardly extending portions of said rocker arms having friction surfaces thereon, said friction surfaces having a horizontal cross-section in the shape of a flattened V.

18. A car truck comprising a bolster, a side frame associated with one end of said bolster, rocker arms pivotally supported on said side frame and held against moving along the axis of said pivot, springs for supporting the bolster, each of said rocker arms having a horizontal portion forming the entire support for at least one of said springs, and downwardly extending friction surfaces connected to said bolster and engaging upwardly extending portions of said rocker arms having friction surfaces thereon.

19. A car truck comprising a bolster, a side frame associated with one end thereof, rocker arms pivotally mounted intermediate the ends thereof on said side frame and having substantially horizontal and vertical portions, springs mounted on said horizontal portions, a member connected to said bolster having lateral extensions comprising spring caps and depending surfaces frictionally engaging surfaces on the vertical portions of said rocker arms.

20. A car truck comprising a bolster, a side frame associated with one end thereof, rocker arms pivotally mounted intermediate the ends thereof on said side frame and having substantially horizontal and vertical portions, springs mounted on said horizontal portions, a member connected to said bolster having lateral extensions comprising spring caps and depending surfaces frictionally engaging surfaces on the vertical portions of said rocker arms, said member being removably connected to said bolster by means of dowels on the one and cooperating recesses on the other, whereby said side frame may be removed by simply lifting said bolster until said dowels are free of said recesses.

21. A car truck comprising a bolster, a side frame associated with one end thereof, rocker arms pivotally mounted intermediate the ends thereof on said side frame and having substantially horizontal and vertical portions, springs mounted on said horizontal portions, a member connected to said bolster having lateral extensions comprising spring caps and depending surfaces frictionally engaging surfaces on the vertical portions of said rocker arms, said frictionally engaging surfaces being substantially the same width as said bolster.

22. A car truck comprising a bolster, a side frame associated with one end thereof, rocker arms pivotally mounted on said side frame being retained thereby against movement along the axis of said pivot and having substantially horizontal and vertical portions, springs mounted on said horizontal portions, a member interlocked with said bolster having lateral extensions comprising spring caps, depending surfaces frictionally engaging surfaces on the vertical portions of said rocker arms, and depending flanges to limit relative movement between said member and said rocker arms in a direction longitudinally of said side frame, said axis being near the junction of said horizontal and vertical portions.

23. In a car truck, a bolster, a side frame associated with one end thereof having a shelf therein, springs mounted in the side frame below said shelf to support lugs of said bolster, rocker arms pivotally mounted on said shelf and having substantially horizontal and vertical portions, an upper bolster supporting spring mounted on the horizontal portion of one of said rocker arms, a separate upper bolster supporting spring, the axis of which is external to the zone occupied by the first mentioned upper spring and mounted on the horizontal portion of the other of said rocker arms, and friction means connected to said bolster having surfaces adapted to frictionally engage surfaces of said vertical portions of the rocker arms.

24. In a car truck, a bolster, a side frame associated with one end thereof having a shelf therein, springs mounted on the side frame below said shelf to support lugs of said bolster, rocker arms pivotally mounted on said shelf adjacent the longitudinal center line of the side frame and having substantially horizontal and vertical portions, springs mounted on said horizontal portions to support the bolster, and friction means connected to said bolster having surfaces adapted to frictionally engage surfaces of said vertical portions of the rocker arms.

25. In a car truck, a bolster, a side frame associated with one end thereof having a shelf therein, springs mounted in the side frame below said shelf to support lugs of said bolster, rocker arms pivotally mounted on said shelf disposed between said lugs and having substantially horizontal and vertical portions, upper-springs mounted on said horizontal portions to support the bolster, and friction means connected to said bolster and extending downwardly between said upper springs having surfaces adapted to frictionally engage surfaces of said vertical portions of the rocker arms.

26. In a car truck, a bolster, a side frame associated with one end thereof having a shelf therein, springs mounted in the side frame below said shelf to support lugs of said bolster, rocker arms pivotally mounted on said shelf disposed between said lugs and having substantially horizontal and vertical portions, an upper bolster supporting spring mounted on the horizontal portion of one of said rocker arms, a separate upper bolster supporting spring, the axis of which is external to the zone occupied by the first mentioned upper spring and mounted on the horizontal portion of the other of said rocker arms, and friction means connected to said bolster and extending downwardly within the coils of said upper springs, having surfaces adapted to frictionally engage surfaces of said vertical portions of the rocker arms.

27. In a car truck, a bolster, a side frame associated with one end thereof having a shelf therein, springs mounted in the side frame below said shelf to support lugs of said bolster, rocker arms pivotally mounted on said shelf disposed between said lugs and having substantially horizontal and vertical portions, upper springs mounted on said horizontal portions to support the bolster, and friction means connected to said bolster and extending downwardly between said upper springs having surfaces adapted to frictionally engage surfaces of said vertical portions of the rocker arms, and having vertically extending walls connecting said surfaces on each side of said rocker arms.

28. In a car truck, a side frame, a bolster, a downwardly opening pocket in the end of said bolster, vertically disposed coil springs within said pocket for supporting said bolster, and means on said side frame for supporting said springs and exerting pressure against certain portions of said pocket.

29. In a car truck, a side frame, a bolster, a downwardly opening pocket in the end of said bolster, said pocket being formed with friction surfaces, vertically disposed coil springs within said pocket for supporting said bolster, and means on said side frames for supporting said springs and exerting pressure against said friction surfaces, 30. A car truck bolster having a downwardly opening hollow end portion, spring means in said portion, rocker members having extensions underlying said spring means and vertically extending portions for cooperation with the walls of said opening and means maintaining said rocker members and said springs in vertically assembled relation to said bolster.

31. A car truck bolster having a downwardly opening hollow end portion, spring means in said portion, rocker members having extensions underlying said spring means and vertically extending portions for cooperation with the walls of said opening, and bolts passing through said bolster and said extensions for maintaining said bolster, spring means and rocker members in vertically assembled relation to each other.

JAMES J. LAZNA.